Jan. 6, 1959 B. M. DURFEE ET AL 2,867,790

INFORMATION STORAGE MATRIX

Filed Dec. 16, 1955 2 Sheets-Sheet 1

INVENTORS
BENJAMIN M. DURFEE &
ALBERT D. MILLER
BY
Campbell, Brumbaugh, Free & Graves
their ATTORNEYS Jan. 6, 1959 B. M. DURFEE ET AL 2,867,790

INFORMATION STORAGE MATRIX

Filed Dec. 16, 1955 2 Sheets-Sheet 2

INVENTORS
BENJAMIN M. DURFEE &
ALBERT D. MILLER

BY Campbell, Brumbaugh, Free & Graves their ATTORNEYS 2,867,790
Patented Jan. 6, 1959

2,867,790

INFORMATION STORAGE MATRIX

Benjamin M. Durfee, Binghamton, and Albert D. Miller, Vestal, N. Y., assignors to International Business Machines Corporation, New York, N. Y., a corporation of New York Application December 16, 1955, Serial No. 553,640

23 Claims. (Cl. 340—173)

This invention relates to information storage matrices and, more particularly, to such matrices formed by switch devices angularly arranged along Cartesian coordinates.

In computers and similar systems, it is necessary to store bits of information for indefinite periods of time. This may be accomplished by the use of electron tubes, cathode ray storage tubes, magnetic storage devices and other known elements. Most of these storage devices require energy to maintain the stored information. Furthermore, those that are passive often store information for only limited time intervals. Of course, it is very desirable to employ a stored matrix which will hold bits of information for an indefinite period without consuming any energy.

Accordingly, it is an object of the present invention to provide a matrix for storing information for an indefinite period without any energy required to maintain such storage.

It is another object of the invention to provide a system of the above character in which a part of the stored information may be removed and the remainder left standing in the matrix.

It is a further object of the invention to provide a system having the above characteristics in which the matrix elements are disposed in accordance with Cartesian coordinates.

It is yet another object of the invention to provide a storage matrix having the above characteristics in which the matrix elements include mercury or amalgam pool type switch elements selectively electrically connected by slidable conductors.

These and further objects of the present invention are accomplished by providing a number of angularly disposed column and value channels which include switch elements electrically joined in response to the movement of storage conductors. Each of these conductors is slidably received by at least two of the switch elements and normally insulated from one of them. In addition, readout conductors are slidably carried by selected switch elements.

The storage conductors may be displaced by slides in one of the column or value channels, further members being disposed in the other of the channels to cooperate with the slides and facilitate displacement of the storage conductors at selected intervals. In addition, the readout conductors are suitably actuated at readout time to transfer the stored information to external circuitry.

In one embodiment of the invention, slides coextensive with the column channels may be selectively longitudinally displaced, this action resulting in the actuation of laterally shiftable actuators found in the value channels. If one or more of such actuators are selectively shifted prior to movement of the column slides, each of such actuators will engage and move an associated storage conductor resulting in the electrical connection of two switch elements. Preferably, the switch elements comprise pools of mercury or amalgam in a container through which the conductors slide.

In this embodiment, readout conductors extending through one set of switch elements are selectively actuated by the same means employed to shift the value actuators. Finally, the storage conductors may be reset by shifting all of the value actuators and moving the column slides in their reverse direction.

In a further embodiment of the invention, slides coextensive with the value channels and carrying actuators are selectively displaced. Restraining elements found in the column channels normally preclude sufficient movement of the actuators for them to engage and slide storage conductors through two switch elements. However, such retraining elements may be selectively displaced in order to permit selected actuators to slide their associated storage conductors. Subsequently, readout conductors extending through certain switch elements are selectively actuated to transfer the stored information to suitable external circuitry. Resetting of the matrix is accomplished by operating the value slides in their reverse direction.

These and further objects and advantages of the present invention will be more readily understood when the following description is read in connection with the accompanying drawings in which.

Figures 1, 2:
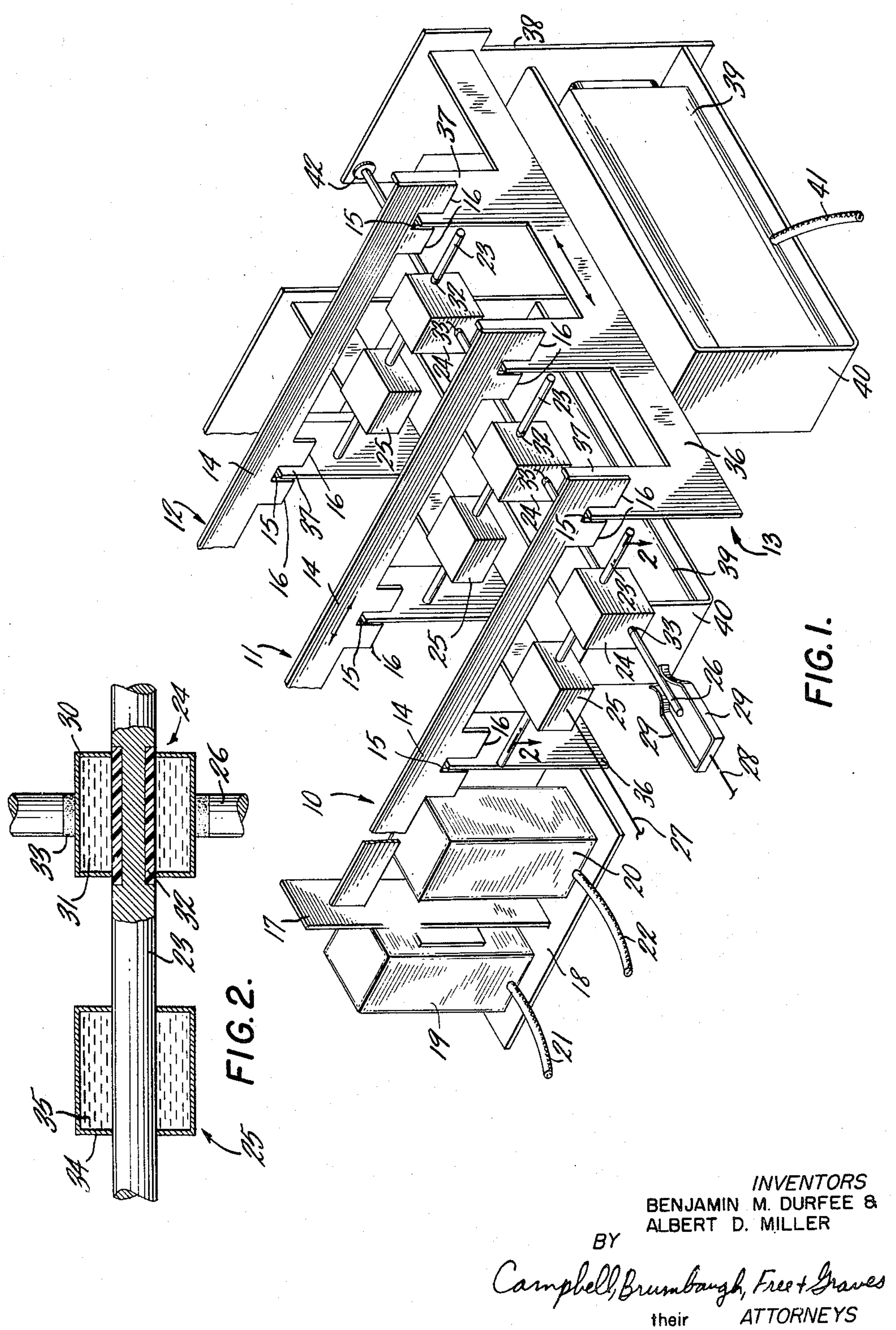
Figure 1 is a diagrammatic view in perspective of a portion of an information storage matrix constructed in accordance with the principles of the present invention.
Figure 2 is a fragmentary section of the apparatus of Figure 1 taken along the view line 2—2 looking in the direction of the arrows.

Referring to the invention in greater detail with particular reference to Figure 1, an information storage matrix comprises three column channels generally designated 10, 11 and 12 and a plurality of value channels 13, only one of which is shown, angularly disposed with respect to the column channels. Each of the column channels includes a column slide 14 provided with notches 15 defined by downwardly extending tabs 16.

The slides 14 are fastened at one end to a flexible armature 17 formed, for example, of spring steel and rigidly secured to a base 18. A pair of electromagnets 19 and 20 are also secured to the base 18 on each side of the armature 17, these devices being selectively energized through cables 21 and 22 to actuate the plate 17 and consequently the slide 14 longitudinally through a predetermined distance forwardly and reversely. For convenience, only one plate 17 and its associated drive means have been shown, it being understood that the remaining column slides 14 are driven by similar elements.

Slidable storage conductors 23 are found in each of the column channels, only one being shown in column 10 for convenience, such conductor extending through switch elements 24 and 25. In addition, a readout conductor 26 is slidably received by the switch element 24 at an angle to the storage conductor 23. Conductors 27 and 28 are respectively joined to the switch element 25 and to a pair of flexible arms 29 slidably contacting the readout conductor 26. As will be described in detail below, the conductors 27 and 28 are selectively joined by suitable actuation of the storage and readout conductors 23 and 26. Therefore, appropriate external recording or other circuitry may be joined to the conductors 27 and 28.

Preferably, the switch elements 24 and 25 are of the mercury or amalgam contact type such as illustrated in Figure 2. Thus, the element 24 includes a container 30 filled with mercury or an amalgam 31. The storage conductor 23 extending through the switch element 24 is provided with insulation 32 along one section normally in contact with the mercury 31, similar insulation 33 being provided on a section of the readout conductor 26 normally in contact with the mercury 31. On the other hand, the switch element 25 merely comprises a container 34 filled with mercury or an amalgam 35 constantly in contact with the storage conductor 23. Since the conductors 23 and 26 are slidably mounted in the switch elements 24 and 25, any substantial displacement of them will cause the pool of mercury 31 to contact the conductors 23 and 26 and electrically join the elements 24 and 25 as well as the storage conductor 23 to the readout conductor 26.

Examining next the elements disposed angularly to the columns 10, 11 and 12, a laterally movable value slide 36 carries an upwardly extending flexible actuator 37 for each column, such actuators formed, for example, of spring steel and disposed in the notches 15 on the column slides 14. One end of the value slide 36 is fixed to a spring steel armature 38 selectively actuated by a value electromagnet 39 which is encased by a housing 40, a cable 41 furnishing energy to the magnet 39.

The armature 38 also laterally displaces the readout conductor 26, this being freely mounted in an opening in the armature 38 by collars 42. Of course, separate driving means may be employed to slide the readout conductors 26 into electrical contact with their associated switch elements 24.

In the interests of clarity, the supporting structure for the various slides, switch elements and magnets have been omitted from the drawings, it being understood that such structure may be disposed as desired in order to support these elements in the relationships described above.

In a typical operation of the information storage matrix illustrated in Figure 1, it will be assumed that the value 9, represented by the channel 13, is to be stored in column 1, represented by the channel 10. Initially, the magnet 39 is energized to shift the slide 36 and the actuators 37 to the left in front of the storage conductors 23. Subsequently, excitation of the magnet 19 actuates the slide 14 in channel 10 so that the actuator 37 in this channel is flexed against its corresponding storage conductor 23. The resulting movement of the conductor 23 electrically joins the conductor 27 to the switch element 24. It will be observed in Figure 1 that the storage conductor 23 in channel 10 has been shifted while those in channels 11 and 12 are in their normal position.

In order to read this information out of the storage matrix, the value magnet 39 is energized at readout time to slide the readout conductor through the switch element 24. Consequently, an electrical connection is made between the mercury pool 31 and the conductor 26 and the conductors 27 and 28 are tied together. This indicates to suitable external circuitry that information has been stored at this point in the matrix.

In resetting the storage conductors 23, all of the magnets 20 may be excited to operate the column slides 14 in their reverse direction during a period when all the value magnets 39 are energized. At this time, the rear side of each of the actuators 37 will engage the adjacent storage conductors 23 and slide them to their initial positions. Of course, selected sections of the matrix may be reset while the stored information is retained in other sections by operating only certain column and value slides.

Figures 3, 4:
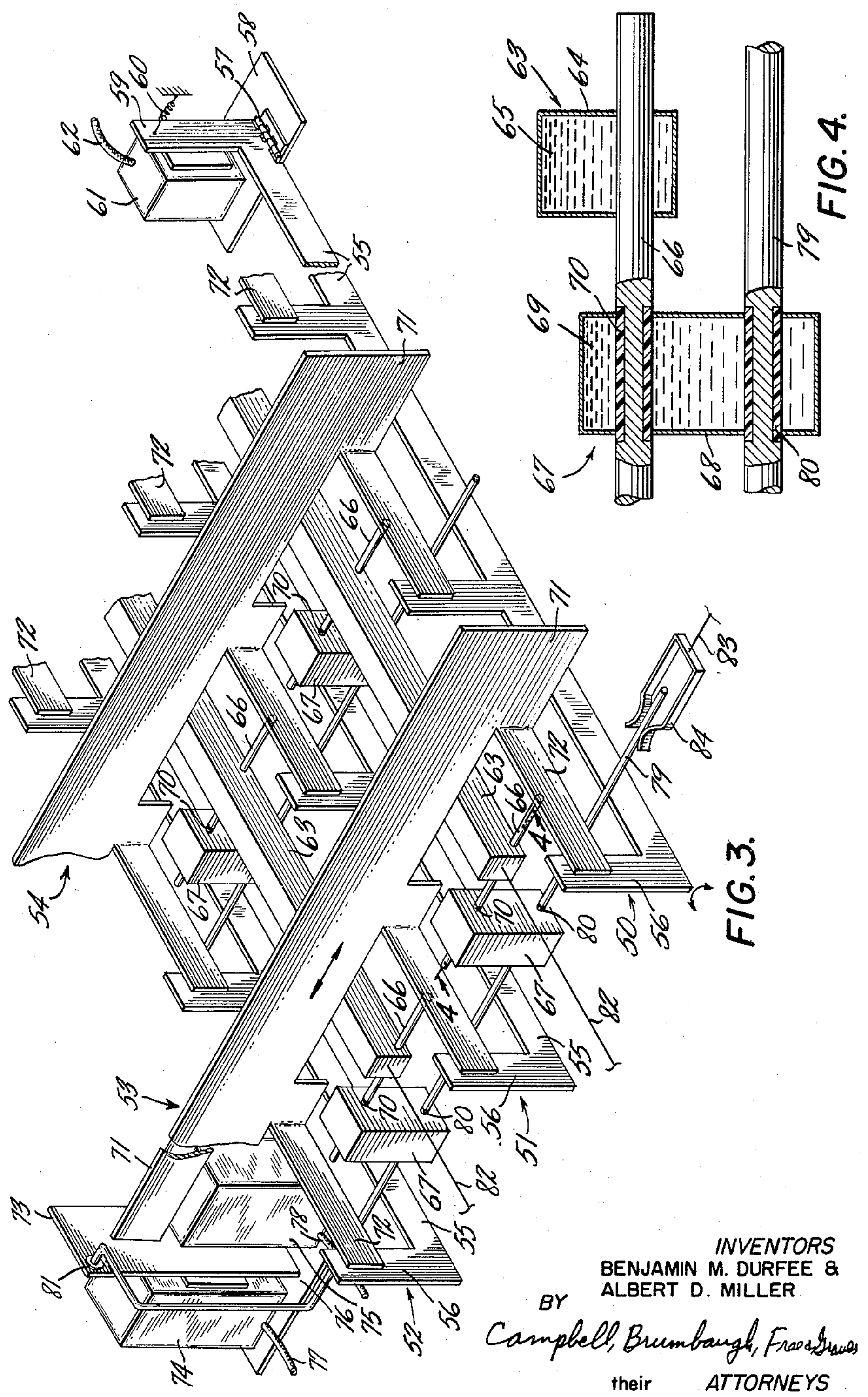
Figure 3 is a view in perspective of a modified storage matrix constructed in accordance with the principles of the present invention.
Figure 4 is a fragmentary section of the apparatus of Figure 3 taken along the view line 4—4 looking in the direction of the arrows.

Examining next the apparatus illustrated in Figure 3, a storage matrix having somewhat different characteristics from the system illustrated in Figure 1 includes a plurality of column channels 50, 51 and 52 and angularly disposed value channels 53 and 54. Considering first the elements found along one of the column channels, a column bar 55 carries a plurality of upwardly extending arms 56 and is rotatably mounted on its lower edge at one end by a hinge 57 secured to a base 58. An armature 59 on the same end is joined by a bias spring 60 to a fixed point, an electromagnet 61 also being mounted on the base 58 adjacent to the armature and attracting it when energized via a cable 62.

A switch element 63 in the column channel 50 comprises a single elongated container 64 filled with mercury or an amalgam 65, as shown in Figure 4. A storage conductor 66 slidably received by the element 63 also extends through a further switch element 67 composed of a container 68 filled with mercury or an amalgam 69, as shown in Figure 4. The storage conductor 66 carries an insulated section 70, similar to the section 32 on the conductor 23 described in connection with Figure 2, so that displacement of the conductor 66 results in the electrical connection of the switch elements 63 and 67.

Turning now to the elements in one of the value channels, a value slide 71 carrying transversely extending flexible actuators 72 formed, for example, of spring steel, and having their ends engaging the upwardly extending arms 56, is fastened at one end to a spring steel armature 73 mounted between electromagnets 74 and 75, these elements all being fastened to a base 76. Energizing cables 77 and 78 lead from the electromagnets 74 and 75 and it will be apparent that this assembly operates to move the slide 71 as explained in connection with a similar structure including the electromagnets 19 and 20 in Figure 1.

A readout conductor 79 extends along each value channel through the switch elements 67 and is insulated therefrom by an insulation section 80 (Figure 4) similar to the section 33 found on the conductor 26 in Figure 1. The readout conductors 79 are secured to the armatures 73 by collars 81 so that they will be displaced by excitation of the electromagnets 74. It will be apparent that separate driving means may be employed to slide the readout conductors 79 into electrical contact with their associated switch elements 67.

A conductor 82 is coupled to each of the switch elements 63 while a conductor 83 is joined by a pair of flexible fingers 84 to each of the readout conductors 79. This facilitates transfer of the information in the matrix to suitable external circuitry.

In a typical operation of the embodiment of the invention illustrated in Figure 3, if it is desirable to store information in the matrix of value 9 in column 1 corresponding to the value channel 53 and column channel 50, the electromagnets 61 and 74 are energized. The resultant rotation of the bar 55 frees the flexible actuator 72 and permits it to engage and slide the storage conductor 66, the switch elements 63 and 67 thus being electrically connected. Since the bar 55 in the column 51 has not been operated, the actuator 72 engaging the corresponding upwardly extending arm 56 will be restrained and although the slide 71 will shift a portion of it, this will not be sufficient to engage and displace its associated storage conductor 66. It will be understood that in this embodiment of the invention, the magnets 61 and 74 may be energized simultaneously or in any desired sequence.

To read information from the matrix, the value magnets 74 are selectively energized at the proper time resulting in actuation of one or more of the readout conductors 79 by virtue of their coupling to the armatures 73. Accordingly, the conductors 82 and 83 will be electrically joined and by connecting these elements to suitable external circuitry, the stored information may be recorded or utilized in any desired manner.

The storage matrix of Figure 3 may be reset by operating all of the magnets 75 to actuate the slides 71 in a reverse direction, the rear side of the arms 72 thereby engaging and urging the storage conductors 66 to their initial positions. Of course, only selected sections of the matrix may be reset by suitable operation of certain of the magnets 75.

From the foregoing, it is evident that passive storage matrices have been provided which will simply and effectively store any desired quantity of information for indefinite periods of time, such information being available piece by piece over a period of time or in toto at any desired time. Furthermore, with the preferred mercury or amalgam switch elements, the storage matrices will operate reliably over long periods of time with minimum maintenance requirements.

It will be understood that the above described embodiments of the invention are illustrative only and modifications thereof will occur to those skilled in the art. Therefore, the invention is not to be limited to the specific apparatus disclosed herein but is to be defined by the appended claims.

We claim:

1. An information storage matrix comprising a plurality of storage conductors each slidably received by at least two switch elements, each of said conductors normally electrically joined to one of said elements and electrically insulated from the other of said elements, a plurality of slides, means for independently moving each of the slides, an actuator for selectively sliding each of said conductors into electrical contact with the other switch element and operated by one of the slides, the operation of said actuators by said slides normally failing to slide the conductors into contact with the other element, and means for selectively enabling a plurality of said actuators to displace at least one selected storage conductor upon operation of an associated slide, said displacement of the conductor electrically connecting its associated two switch elements.

2. Apparatus as defined in claim 1 in which a readout conductor is slidably received by each of the other switch elements and normally electrically insulated therefrom, and means for selectively sliding said readout conductors into electrical contact with said other switch elements.

3. Apparatus as defined in claim 2 in which means are provided for resetting each of the storage conductors by reversing the movement of the actuators, said reverse movement urging the actuators against the storage conductors to slide them to their initial positions.

4. An information storage matrix comprising a plurality of storage conductors each slidably received by at least two switch elements, means insulating one of said elements from its associated storage conductor, a plurality of longitudinally movable slides, means for independently moving each of said slides, an actuator for selectively sliding each of said conductors and operated by one of the slides, means for laterally shifting said actuators between two positions, each of said actuators when operated in its second position engaging and sliding one of said conductors to disable the insulating means and electrically connect its associated two switch elements.

5. Apparatus as defined in claim 4 in which a readout conductor is slidably received by each of the switch elements associated with the insulating means and normally insulated therefrom, said lateral shifting means engaging and sliding each of said readout conductors into electrical contact with each of their associated switch elements.

6. Apparatus as defined in claim 5 in which means are provided for resetting each of the storage conductors by reversing the movement of the slides while the actuators are in their second position so that the actuators engage and slide the storage conductors to their initial positions.

7. An information storage matrix comprising a plurality of storage conductors each slidably received by at least two mercury pool type switch elements, means insulating one of said pools from its associated storage conductor, a plurality of longitudinally movable slides, means for independently moving each of said slides, an actuator for selectively sliding each of said conductors and operated by one of the slides, means for laterally shifting said actuators between two positions, each of said actuators when operated in its second position engaging and sliding one of said conductors to disable the insulating means and electrically connect its associated two switch elements.

8. Apparatus as defined in claim 7 in which a readout conductor is slidably received by each of the mercury pool type switch elements associated with the insulating means and normally insulated therefrom, said lateral shifting means engaging and sliding each of said readout conductors into electrical contact with each of their associated switch elements.

9. Apparatus as defined in claim 8 in which means are provided for resetting each of the storage conductors by reversing the movement of the slides while the actuators are in their second position so that the actuators engage and slide the storage conductors to their initial positions.

10. An information storage matrix comprising a plurality of storage conductors each slidably received by at least two mercury pool type switch elements, means insulating one of said pools from its associated storage conductor, a plurality of longitudinally movable notched slides, means for independently moving each of said notched slides, a plurality of laterally movable slides formed with longitudinally movable actuators extending into the notches and being displaced with said notched slides, means for shifting said laterally movable slides between two positions, each of said actuators when longitudinally moved from its second position engaging and sliding one of said conductors to disable the insulating means and electrically connect its associated two switch elements.

11. Apparatus as defined in claim 10 in which a readout conductor is slidably received by each of the mercury pool type switch elements associated with the insulating means and is normally insulated therefrom, and means including said shifting means for sliding the readout conductors into electrical contact with their associated switch elements upon movement of said lateral slides.

12. Apparatus as defined in claim 11 in which means are provided for resetting the storage conductors by reversing the movement of the notched slides while the laterally movable slides are in their second position, said reverse movement urging the reverse sides of the actuators against the storage conductors to slide them to their initial positions.

13. An information storage matrix comprising a plurality of storage conductors each slidably received by at least two switch elements, means insulating one of said elements from its associated storage conductor, a plurality of longitudinally movable slides, means for independently moving each of said slides, an actuator operated by one of the slides along a path for selectively sliding each of said conductors, a member at least partially in the path for restraining at least a portion of each of the actuators from moving along its path, and means for selectively moving each of said members out of the path of its associated actuator so that the operation of one of said unrestrained actuators will slide one of said conductors to disable said insulating means and electrically connect its two associated switch elements.

14. Apparatus as defined in claim 13 in which a readout conductor is slidably received by each of the switch elements associated with the insulating means and is normally insulated therefrom, and means including said slide moving means for selectively sliding the readout conductors into electrical contact with their associated switch elements upon movements of said slides.

15. Apparatus as defined in claim 14 in which means are provided for resetting each of the storage conductors by reversing the movement of the slides, said reverse movement urging the reverse sides of the actuators against the storage conductors to slide them to their initial positions.

16. An information storage matrix comprising a plurality of storage conductors each slidably received by at least two mercury pool type switch elements, means insulating one of said pools from its associated storage conductor, a plurality of longitudinally movable slides, means for independently moving each of said slides, an actuator operated by one of the slides along a path for selectively sliding each of said conductors, a member at least partially in the path for restraining at least a portion of each of the actuators from moving along its path, and means for selectively moving each of said members out of the path of its associated actuator so that the operation of one of said unrestrained actuators will slide one of said conductors to disable said insulating means and electrically connect its two associated switch elements.

17. Apparatus as defined in claim 16 in which a readout conductor is slidably received by each of the mercury pool type switch elements associated with the insulating means and is normally insulated therefrom, and means including said slide moving means for selectively sliding the readout conductors into electrical contact with their associated switch elements upon movement of said slides.

18. Apparatus as defined in claim 17 in which means are provided for resetting each of the storage conductors by reversing the movement of the slides, said reverse movement urging the reverse sides of the actuators against the storage conductors to slide them to their initial positions.

19. An information storage matrix comprising a plurality of storage conductors each slidably received by at least two mercury pool type switch elements, means insulating one of said pools from its associated storage conductor, a plurality of longitudinally movable slides, means for independently moving each of said slides, a laterally extending flexible actuator on one of the slides selectively operated along a path for engaging and sliding each of the storage conductors, a member at least partially in the path for restraining at least a portion of each of the actuators from moving along its path, and means for selectively moving each of said members out of the path of its associated actuator so that the operation of one of said unrestrained actuators will slide one of said storage conductors to disable said insulating means and electrically connect its associated switch elements.

20. Apparatus as defined in claim 19 in which a readout conductor is slidably received by each of the mercury pool switch elements associated with the insulating means and is normally insulated therefrom, and means including said slide moving means for selectively sliding the readout conductors into electrical contact with their associated switch elements upon movement of said slides.

21. Apparatus as defined in claim 20 in which means are provided for resetting each of the storage conductors by reversing the movement of the slides, said reverse movement urging the reverse sides of the actuators against the storage conductors to slide them to their initial positions.

22. In an information storage matrix, a plurality of elements each movable from an initial position to a displaced position, a plurality of longitudinally movable notched slides, means to move each of said notched slides independently in the direction of movement of said elements, a plurality of laterally movable slides formed with longitudinally movable actuators extending into the notches and being displaced with said notched slides, means to shift said laterally movable slides between two positions, each of said actuators when longitudinally moved from its second position by the associated notched slide engaging and moving one of said elements from its initial to its displaced position.

23. In an information storage matrix, a plurality of elements each movable from a first to a second position, a plurality of longitudinally movable slides, means to move each of said slides independently in the direction of movement of said elements, a laterally extending flexible actuator on one of the slides selectively operated along a path for engaging and moving each of the elements, a member at least partially in the path for restraining at least a portion of each of the actuators from moving along its path, and means to move each of said members out of the path of its associated actuator selectively so that the operation of one of said unrestrained actuators will move one of said elements from its first position to its second position.

References Cited in the file of this patent

UNITED STATES PATENTS 2,540,226 Williams ______________ Feb. 6, 1951